SEARCH ROOM

June 1, 1954 L. A. DORFF 2,680,154

ARRANGEMENT FOR SINGLE-CHANNEL TIME SHARING

Filed Oct. 5, 1950 2 Sheets-Sheet 1

INVENTOR
L. A. DORFF
BY H. A. Burgess
ATTORNEY

ARRANGEMENT FOR SINGLE-CHANNEL TIME SHARING

Filed Oct. 5, 1950 2 Sheets-Sheet 2

INVENTOR
L. A. DORFF
BY H. A. Burgess
ATTORNEY

Patented June 1, 1954 2,680,154

UNITED STATES PATENT OFFICE 2,680,154

ARRANGEMENT FOR SINGLE-CHANNEL TIME SHARING

Louis A. Dorff, Glen Ridge, N. J., assignor to Bell Telephone Laboratories, Incorporated, New York, N. Y., a corporation of New York Application October 5, 1950, Serial No. 188,638

5 Claims. (Cl. 179—15.5)

This invention relates to radio signaling systems and particularly to the problem of controlling the use of a common radio station. More particularly it relates to arrangements for controlling a single-channel radio station used in common by several independent operators so that it will be assigned to only one operator at a time.

In providing radio telephone service it is often desirable in the interest of economy of equipment and channel space to allow common use of a radio station by several operators. One example of this is radio telephone dispatch service to taxicabs, where several taxicab companies in the same area share the use of a common radio telephone station, operating on a single radio channel, to dispatch their particular cabs.

In order to avoid mutual interference between the operators in such a system it is necessary to have them share time on the common channel and equipment. To do this by verbal communication between the operators would require careful supervision at each operating point; in view of the competitive nature of the service, this would be likely to lead to confusion and argument. One solution of this problem is provided by the present invention.

The invention is also applicable to any similar service operating on a single channel and using a common outlet. For example, it is applicable to an information service where an operator at a central station answers calling subscribers; or to a service embracing an order clerk receiving orders or requests from customers.

In the embodiment described hereinafter the invention comprises a common central radio telephone station equipped with a transmitter and a receiver for communication with outlying stations, as for example taxicabs; a number of individual operator stations each having a handset, a loudspeaker, a signal lamp, and a push-to-talk switch; trunk circuits connecting the operator stations to the central station; and a sequence assignment circuit for automatically governing the use of the central station by the individual operators. Although a single-frequency channel, requiring a push-to-talk switch, is assumed in the application herein described, it is obvious that a two-frequency channel could be provided for by a simple modification of the circuit.

A feature of the invention is a storage circuit for operator calls initiated while the equipment is busy.

Another feature is a gate circuit for admitting in a group calls that are waiting in the storage circuit.

Another feature is the provision of means for assigning those operators within the gate to the use of the equipment in a fixed sequence.

Another feature is the provision of an operator from immediately regaining access to the equipment after completing his call if another operator is waiting.

Still another feature is a timing circuit for preventing an operator from holding the equipment busy longer than a predetermined interval when another operator is waiting.

These and other features of the invention are more clearly set forth in the following detailed description and accompanying drawings, of which:

Figure 1:
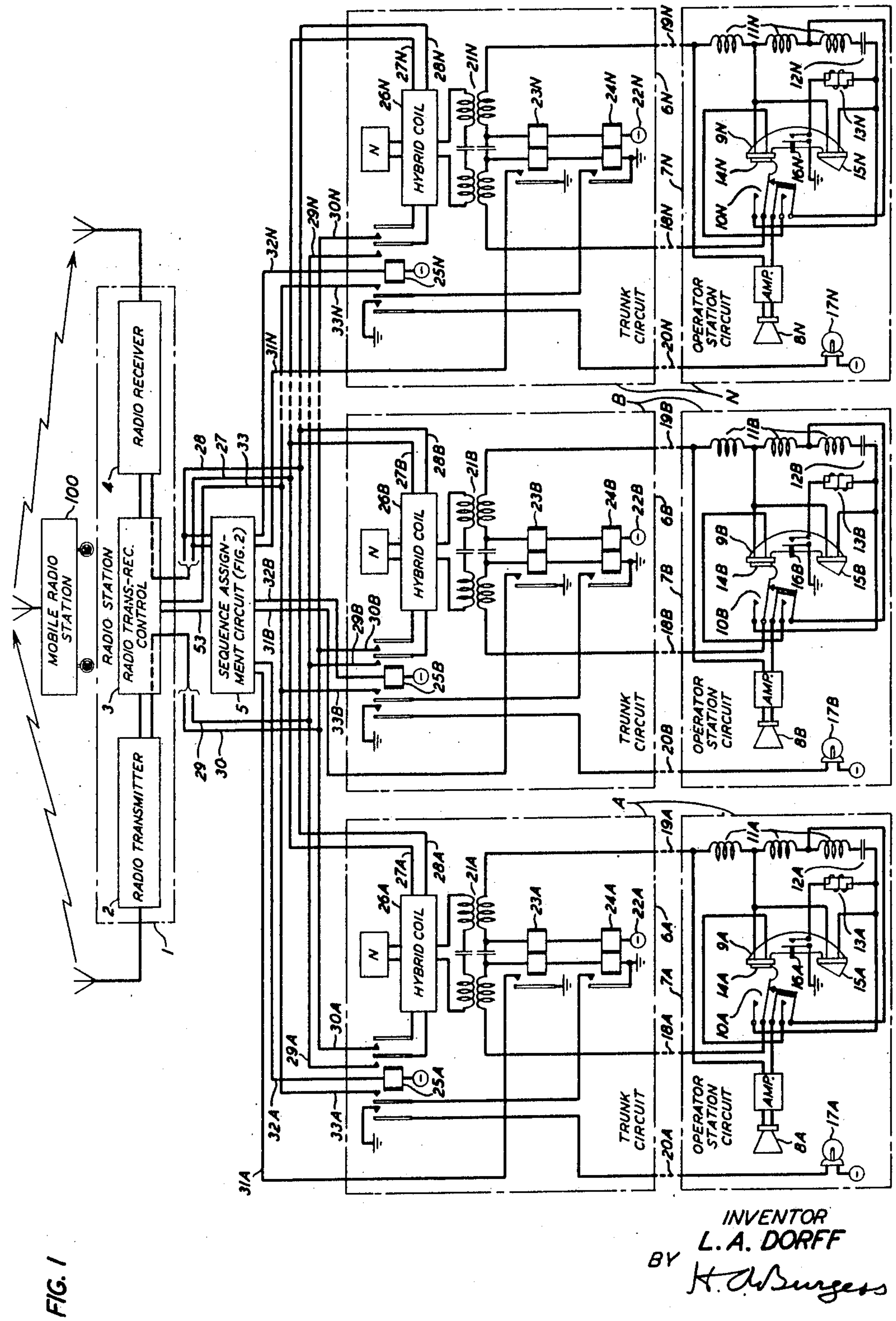
Fig. 1 represents the system as a whole.

Referring to Fig. 1, the reference numeral 1 designates a radio station including a radio transmitter 2, radio transmitter-receiver control circuit 3 and radio receiver 4, all of well-known construction. The numeral 5 designates a sequence assignment circuit, located at the radio station and shown in more detail in Fig. 2. The letters A, B . . . N designate a plurality of operator equipments, the corresponding parts of each being designated by the same numeral in conjunction with the letters distinguishing the different equipments, each equipment comprising an operator trunk circuit 6 and an operator station circuit 7. For convenience the letter A will be used indiscriminately in referring to the first equipment, its location, or the operator thereat, the letter B to the second, etc., whereas the letter N will be used for the last equipment, location or operator, rather than being restricted to the fourteenth according to its alphabetical sequence. The numeral 100 designates one of a plurality of mobile stations, each equipped with a radio transmitter and receiver tuned to the common channel.

Each of the operator station circuits 7 includes an amplifier-loudspeaker 8 for the reception of incoming calls, normally connected to the radio receiver 4 through the trunk circuit 6 and radio transmitter-receiver control circuit 3, a handset telephone 9, a switchhook 10, an induction coil 11, a condenser 12 and choke coil 13. The handset 9 has the usual telephone receiver 14, telephone transmitter 15 and push-to-talk switch 16 for controlling the operation of radio transmitter 2. An assignment lamp 17 signals the operator whenever the operator circuit 7 is connected to the radio transmitter 2.

In order that the operators can be situated at different locations and at a distance from the radio station equipment, a trunk circuit 6 is provided at the central radio station for each of the operating locations. Three conductors 18, 19 and 20 are required between each trunk circuit 6 and operator station circuit 7.

The trunk circuit 6 includes a repeating coil 21 for supplying talking battery 22 to the operator station circuit 7, a supervisory relay 23, a push-to-talk control relay 24, a hybrid coil and balancing network 26 for converting the two-conductor (18 and 19) talking circuit at the operator location to a four-conductor circuit, two conductors of which (27 and 28) connect to the radio receiver 4 and two others (29 and 30) to the radio transmitter 2; and an assignment relay 25 which operates under control of the sequence assignment circuit 5 to connect one and only one operator in the proper sequence to the radio transmitter 2.

METHOD OF OPERATION

A general description of the operation and features of the invention will now be given, without, however, going into details of the operation of the sequence assignment circuit (Fig. 2) of this stage.

Suppose the operator at the operating location B wishes to use the radio channel. Referring to Fig. 1, the operator will remove the telephone handset 9B from the switchhook 10B. Operation of the switchhook 10B disconnects the amplifier-loudspeaker 8B from across the trunk conductors 18B and 19B and connects the telephone receiver 14B across these trunk conductors through coil 11B and condenser 12B. The telephone transmitter 15B is also connected across the trunk conductors through coil 11B. Battery 22B in the trunk circuit 6B is fed to the telephone transmitter 15B through the relays 24B and 23B and the repeating coil 21B. Flow of current through this circuit operates the supervisory relay 23B, but the push-to-talk relay 24B will not operate because of its differential winding. Operation of relay 23B places ground on the start lead 31B to the sequence assignment circuit 5, a detailed description of which will be given later.

The sequence assignment circuit 5 will connect operator B to the radio transmitter 2. In doing so it places ground on the assignment lead 32B, thereby operating the assignment relay 25B which connects the talking leads 29B and 30B from the radio transmitter 2 to the transmitter windings of the hybrid coil 26B, and also places ground on the assignment lamp lead 20B to light the assignment lamp 17B at the operating location as a signal that the radio transmitter 2 has been connected to the operator at station B.

When operator B is connected to the radio transmitter, transmission will take place every time he depresses the push-to-talk button 16B of the telephone handset 9B. Each operation of the push-to-talk button grounds lead 18B through the retard coil 13B and hook switch 10B and causes the operation of the differential push-to-talk relay 24B of the trunk circuit 6B, thus placing ground through operated relay 25B on the push-to-talk control lead 33B. This ground controls the operation of the radio transmitter 2 through the radio transmitter-receiver control circuit 3 and the operated assignment relay 25B, in a manner well known in such art.

The sequence of events in answering a call heard over the loudspeaker is identical with that described above. It is assumed that on hearing a call for another operator, all operators not called will refrain from lifting their handsets to make a call, or will hang up their handsets if just initiating a call, thereby allowing the operator called to be immediately assigned to the radio transmitter.

When operator B has completed his call and hangs up the telephone handset 9B on switchhook 10B, the supervisory relay 23B releases, thereby releasing the radio transmitter 2 by removing ground from the start lead 31B to the sequence circuit 5. If B should immediately attempt to make another call while another operator is waiting, the sequence assignment circuit will hold B locked in the circuit to prevent this operator from being immediately reassigned to the radio transmitter; he must wait until the other operator is served. A timing feature included in the sequence assignment circuit allows an operator to hold the transmitter for only a predetermined maximum interval. The manner in which the circuit performs these functions will be explained in detail hereinafter.

While B's call is in progress, a gate circuit arrangement in the sequence assignment circuit 5 is closed, and other operators who are attempting to make calls during this time are required to wait. A storage circuit included in the sequence assignment circuit is provided for these waiting calls. When the radio transmitter 2 is released at the termination of B's call, the gate opens to allow all waiting operators to enter the sequence chain and then immediately closes to prevent, for the time being, further entry of operators initiating a request for the radio transmitter. The sequence arrangement of this circuit will serve all operators that entered the gate before allowing the gate to open again. The operators within the gate will always be served in a fixed sequence. In the example illustrated in the drawings, the sequence will function in the alphabetical order of the operator stations, that is, A will be first, B second, and so on to N, where N represents the last station, as previously explained. While this may not be the actual time sequence in which the calls originated, a good grade of service is nevertheless assured, due to the small number of operators normally entering the gate at any one time, and to the feature of the circuit that controls the reentry of an operator after being served. As previously stated, the operators gaining entrance through the gate circuit together are held in the sequence assignment circuit until they are all served once. Before they are released the gate opens, allowing another waiting group of operators to enter the circuit; it then recloses, after which the first group served is released to return to normal or to initiate new calls. Thus an operator that has just been served is prevented from immediately reentering the sequence circuit and thereby possibly taking precedence due to his position in the fixed sequence, before other waiting operators have been served.

The timing feature previously mentioned prevents any operator from holding the radio transmitter too long after its assignment to that operator. The timing circuit starts timing at the beginning of each call, and should the call continue beyond a predetermined interval for which the timing circuit is set, it will function to release the operator assigned and select another operator with a call waiting. The operator assigned to the radio transmitter will receive a low level warning tone 30 seconds before the timing circuit disconnects the radio transmitter. Should no calls be waiting when the timing feature releases the operator, the circuit will function to allow immediate reassignment of the radio transmitter to this operator. The interruption will only be momentary.

A description will now be given in detail of the operation of the sequence assignment circuit 5, with particular reference to Fig. 2.

1. *Channel idle, no calls waiting*

1.1 *Call initiated or answered*

Figure 2:
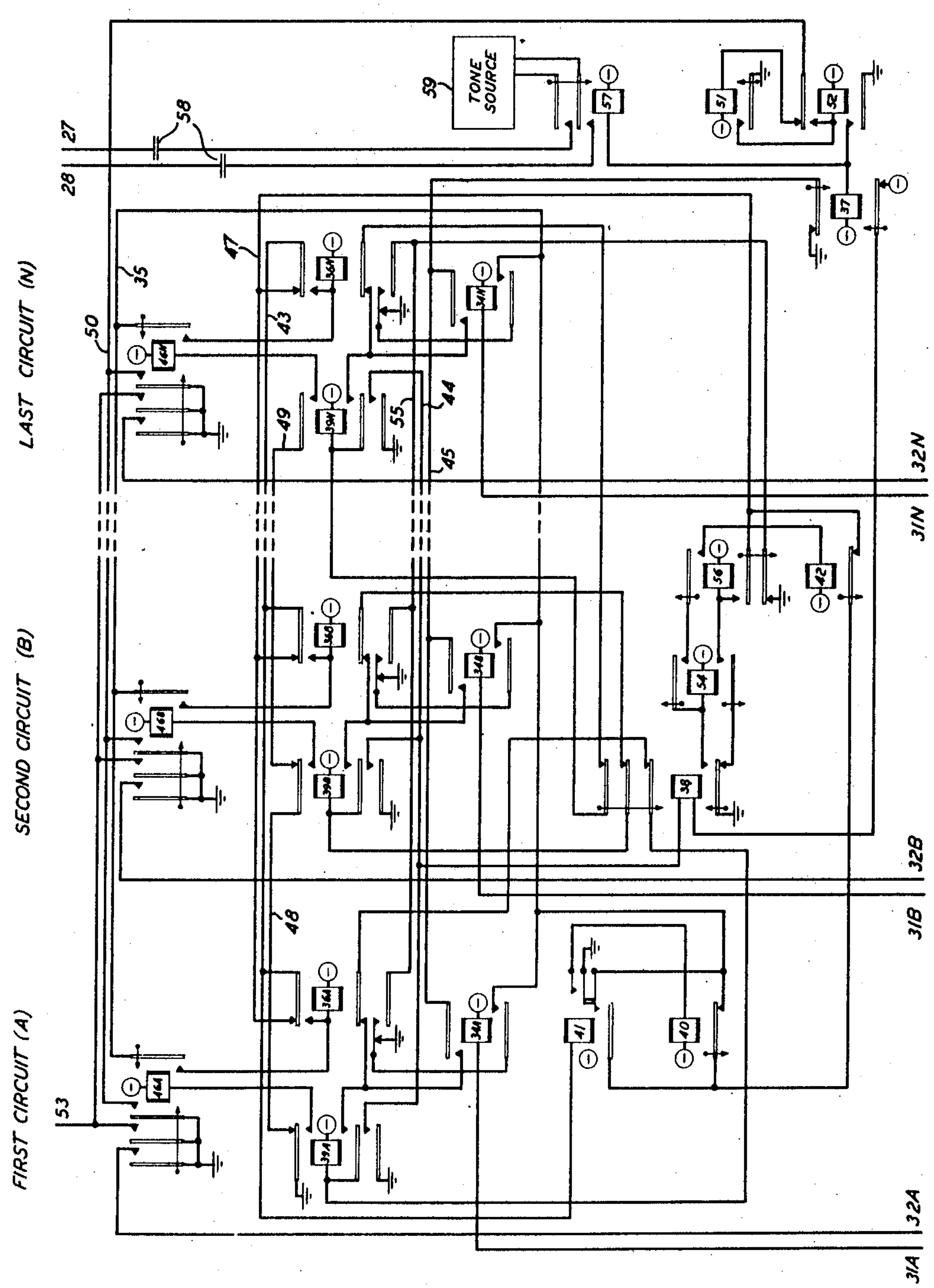
Fig. 2 shows details of a portion of the system, constituting a sequence assignment circuit.

The sequence assignment circuit 5 shown in Fig. 2 comprises a number of interlocking relays. It also includes the tone source 59.

Let it be assumed that the operator at station B initiates or answers a call. As previously described, the removal of the handset 9B (Fig. 1) from the switchhook 10B causes the operation of the supervisory relay 23B of trunk circuit 6B. This in turn grounds the start lead 31B to the gate and sequence circuit 5.

Ground on start lead 31B operates the start relay 34B (Fig. 2). Operation of this relay (*a*) applies ground from a back contact of relay 36B through a bottom make contact of relay 34B to the hold lead 35, and (*b*) operates the sequence relay 39B from ground on the top back contact of relay 37, over sequence relay hold lead 45, through the top make contact of relay 34B, through the bottom back contact of relay 36B and through the middle upper back contact of relay 38.

Ground on lead 35 through the bottom back contact of relay 40 and the back contact of relay 42 is applied to the guard relay lock lead 47, and through the top back contacts of all relays 36 to the guard relay supplementary lock lead 43 to operate the guard lock control relay 41.

Operation of the sequence relay 39B (*a*) grounds the gate operating lead 44 from its bottom make contact to operate the common gate relay 38, which closes the gate and prevents the entry of any other operators into the sequence chain of the sequence assignment circuit until after operator B has been served; (*b*) locks itself through a bottom make contact to the start relay 34B and ground on the sequence relay lock lead 45; and (*c*) operates the cut-through relay 46B from ground on the back contact of the first sequence relay 39A, over sequence lead 48 and through the top make contact of relay 39B.

Operation of the guard lock control relay 41 (*a*) closes a hold lead 35 through its bottom make contact, and (*b*) operates the guard lock control relay 40. Thus the operation of relays 41 and 40 changes the path from the grounding lead 35 to lead 47 from a path through the back contact of the slow-release relay 40 to one through the make contact of the fast-release relay 41, in order to guarantee the release of the guard relays 36 when the lock is removed.

Operation of the common gate relay 38 prevents the entry of other operators into the sequence chain by opening all sequence relay 39 operating paths. It also operates the gate clearing relay 54.

Operation of the cut-through relay 46B (*a*) grounds assignment lead 32B through a left make contact to operate the assignment relay 25B (Fig 1) of operator B's trunk circuit 6B, which in turn lights the assignment lamp 17B of operator circuit 7B, informing the operator that the radio transmitter has been assigned to B and that the call may proceed; (*b*) grounds the transmitter control lead 53 through a left make contact to energize the radio transmitter 2; (*c*) grounds the timing lead 50 through a left make contact and a back contact of relay 52 to operate the timing start relay 51; and (*d*) operates the guard relay 36B from ground on lead 35 through a right make contact.

Operation of the timing start relay 51 operates the timing hold relay 52 through a bottom make contact. Operation of relay 52 (*a*) locks itself to the grounded timing lead 50, and (*b*) starts operation of the assignment timing relay 37 and warning relay 57. These are both gas or thermal slow-to-operate relays. Relay 37 measures the length of time the radio transmitter 2 is assigned to one operator; if this is two minutes, for example, it will require two minutes for relay 37 to operate. Relay 57 is timed to operate about 30 seconds before relay 37 operates (requiring 1½ minutes to operate). Its operation connects a low level tone from tone source 59 through condensers 58 to the receiver leads 27 and 28 of Fig. 1. This tone warns the operator that the assignment period is about to terminate. The time settings of relays 37 and 57 will depend in large measure on the type of service using this invention.

Operation of the guard relay 36B (*a*) completes a locking circuit to the guard relay supplementary locking lead 43 through a top contact; (*b*) opens the operate path of the 39B relay through its bottom back contact; and (*c*) transfers holding ground from its bottom back contact to ground from a bottom back contact of relay 56 over the gate relay ground control lead 55 and a bottom make contact. This is a make-before-break transfer to prevent momentary removal of ground from the hold lead 35.

The guard relays 36 prevent any operator who has been assigned the radio transmitter from returning to the sequence chain with a subsequent call before other waiting operators are served. This is one of the important features of the invention.

The operator at station B is now connected to the radio transmitter and proceeds with his call in the manner previously described.

1.2 *Call completed*

When the operator at station B hangs up, the bridge is removed from the leads 18B and 19B of the trunk, releasing relay 23B (Fig. 1). This removes ground from the start lead 31B and releases the start relay 34B (Fig. 2). The release of relay 34B (*a*) removes ground from the hold lead 35, and (*b*) releases the sequence relay 39B.

Removal of ground from lead 35 removes ground from leads 47 and 43 provided no operators are waiting (and hence no start relays 34 are operated), releasing guard relay 36B and guard lock control relay 41.

Release of relay 39B (*a*) releases the cut-through relay 46B; (*b*) closes the sequence operate path to the sequence relay 39 next in alphabetical order, and (*c*) releases the common gate relay 38 if no other calls are waiting in the sequence (i. e., if the next relay 39 is not operated).

Release of the fast-release guard lock control relay 41 opens the guard relay locking lead 47 and releases the slow-release guard lock control relay 40. The slow release of relay 40 keeps lead 47 open momentarily, to make sure that all guard relays 36 release before another operator making an attempt to place a call causes a relay 34 to operate, which would reoperate relay 41.

Release of the guard relay 36B, provided no other operators are waiting, allows operator B to immediately reenter the sequence on a subsequent call or on an uncompleted call after a time limit disconnection. Should another operator be waiting, relay 36B will not release and B cannot enter the sequence again until all operators then waiting are served.

Release of the common gate relay 38 (*a*) allows other operators to enter the sequence; (*b*) releases the slow-release gate clearing relay 54; and (*c*) operates the gate clearing relay 56 through the slow-release relay 54, which locks up to other start relays 34 if operated, or immediately releases if no operators are waiting.

Release of the cut-through relay 46B (*a*) extinguishes the assignment lamp 17B at the operator location; (*b*) removes ground from the radio transmitter control lead 53, disabling the radio transmitter 2; and (*c*) removes ground from the timing control lead 50, releasing the fast-release timing hold relay 52.

Release of relay 52 opens the operating path to the two timing relays 37 and 57, thereby recycling them for the next call.

All relays are now back to normal, provided no operators are attempting to make calls.

2. *Channel busy*

2.1 *Calls initiated by idle operators*

If, while the channel or radio equipment is busy as described in section 1 above, other operators desire to place calls, they will remove their handsets 9 from the switchhooks 10, thus causing the operation of their respective start relays 34 in the sequence circuit of Fig. 2. If a call is in progress or if operators are waiting in the sequence chain (relays 39 operated), the common gate relay 38 will be operated and nothing further will happen to the newly initiated requests for the radio transmitter. The start relays 34 perform the function of a storage circuit for these waiting calls.

When all the operators in the sequence chain have been served (all sequence relays 39 released), the common gate relay 38 releases, opening the gate for the entry of new calls. This allows all operated start relays 34 (waiting calls) to operate their respective sequence relays 39. Operation of the sequence relays 39 will reoperate the common gate relay 38, closing the gate against new attempts.

The first station in alphabetical order of the series A, B . . . N having its sequence relay 39 operated will be the first to be assigned the radio transmitter 2, since the operation of a cut-through relay 46 depends on a fixed sequence path via leads 48 and 49 through the contacts of the sequence relays 39. This will result in operators being served in other than a true sequence with respect to the time of the initiation of their calls. However, this will have little effect on the service as long as any one operator is not allowed to hold the equipment for too long a period.

As each operator within the gate is served, the sequence assignment circuit functions as described under section 1 above. When a call is completed, however, the guard relays 36 remain locked up to the operated start relay 34 of some operator not yet served, or not yet inside the gate circuit. When all operators inside the gate are served, their start relays 34 will have all released, releasing their sequence 39 and cut-through 46 relays in turn, and recycling the timing relays after each call. When the last sequence relay 39 in that group of calls has released, the common gate relay 38 releases, opening the gate again.

Assuming other operators to be waiting with their respective start relays 34 operated, the release of the common gate relay 38 allows their sequence relays 39 to operate, again operating the gate relay 38 (closing the gate). Those operators having just previously entered the gate and having been served in sequence will have their guard relays 36 locked to the common hold ground supplied by the operated start relays 34 of operators awaiting assignment. The guard relays 36 will not be released until the waiting operators have entered the sequence circuit (sequence relays 39 operated) and the gate relay 38 has reoperated, thereby operating the gate clearing relay 42 which opens the guard relay locking lead 47. This releases all operated guard relays 36 and the guard lock control relays 40 and 41. The latter relays insure the release of all locked up guard relays. The release of the guard relays 36 allows any subsequent calls that might be initiated by the same operators to reenter the sequence on the next opening of the gate relay 38.

3. *Individual guard relays*

The guard relay feature, represented by the relays 36, which might be looked upon as individual gates as distinguished from the common gate represented by relay 38, has been mentioned in the preceding description. As already indicated, this feature prevents an operator from reentering the sequence chain with a second call on two successive openings of the common gate relay. Without this feature it would be possible for a low-numbered operator in the fixed sequence to get preferential treatment, as he would always be near the head of the line. Its inclusion diminishes the effect of the fixed sequence.

If no operators are waiting when the last one in the sequence chain has been served, an operator still in the sequence chain can be immediately reassigned when he attempts a subsequent call. Assume that operators A and B enter the gate circuit together. Operator A will be served first. Upon the completion of that call the cut-through 46A, sequence 39A and start 34A relays will release, but the guard relay 36A will remain locked through leads 43, 47 and 35 to the operated start relay 34B. Operator B will then be served. Suppose that during this call operator A initiates a new call, reoperating the start relay 34A. When operator B's call is completed, relays 46B, 29B and 34B will release, thus releasing the common gate relay 38. Release of relay 38 will operate the gate clearing relay 56. If some operator other than A or B is waiting, relay 56 will lock to the ground of that operator's start relay 34. However, if no other operator except A is waiting, relay 56 in operating will remove ground from its bottom back contact, lead 55, the operated guard relay 36A and start relay 34A, lead 35, make contact of relay 41, back contact of relay 42, lead 47, and back contact of a non-operated guard relay 36, thus releasing guard relays 36A and 36B. Slow-release relay 56 will also release. With the guard relay 36A released and the gate relay 38 released, operator A will enter the sequence chain as described above.

Should there have been some other operator waiting, on the other hand, the corresponding start relay ground on lead 35 would have held the guard relay 36A and relay 56 operated, thereby preventing the entry of operator A's call into the sequence chain. Upon the closing of the gate, however, the operation of relay 42 would have released the guard relay 36A and allowed operator A to enter the sequence chain on the next opening of the gate.

In summary, each time the common gate relay 38 operates, it operates the first gate clearing relay 54. When the gate relay 38 releases following the assignment and completion of all calls in the sequence circuit, the second gate clearing relay 56 operates and locks to the common holding ground on lead 47 from some operated start relay 34 whose guard relay 36 is not operated. In order not to lock out second attempts by operators that have just been served, until a period when no calls are waiting, the gate clearing relay 42 operates as soon as the gate relay 38 reoperates (gate closes with a new group of calls in the sequence chain), opening lead 47 and allowing all locked up guard relays 36 to release. The gate clearing relay 56 also releases, to be ready for the next cycle.

It is to be understood that the above-described arrangement is illustrative of the principles of the invention. Other arrangements may be devised by those skilled in the art without departing from the spirit and scope of the invention.

What is claimed is:

1. A communication system including an outlet station, an outgoing communication channel, one or more telephone stations connected in common by said communication channel to said outlet station, and a plurality of calling stations to be connected to said outlet station for communicating with any one of said telephone stations and switching apparatus connected between said calling stations and said outlet station to provide for the exclusive connection of said calling stations to said outlet station one at a time when a group of said stations is attempting to make calls during the same period, said apparatus including means for storing calls attempted by other stations during service of said group of stations, means responsive to service of the last calling station of said group to serve calls stored in said storage means during service of said group, and means for reconnecting a calling station in said group to said outlet station only when all stored calls have been served.

2. In a radio communication system including a radio station having a transmitter and a receiver operating on a single radio channel, a plurality of outlying stations each having a transmitter and a receiver tuned to said radio channel and a plurality of operator stations to be connected by wire lines to said radio station for communicating with said outlying stations, control equipment for connecting said operator stations to said radio station comprising a circuit for the storage of calls from operator stations if said radio station is busy and comprising individual storage devices associated with each operator station, a sequence assignment circuit connected to said radio station, a gate circuit between said storage circuit and said sequence assignment circuit for connecting all storage devices in which a call is stored to said sequence assignment circuit to admit in a group all calls that may be waiting in said storage circuit, said sequence assignment circuit including means for servicing in a fixed sequence the said admitted group of calls, and also including holding means responsive to the presence of waiting calls in said storage circuit for temporarily preventing the reconnection, after the servicing of said group of calls, of any of the operator stations initiating calls of said groups to the associated storage device, means responsive to the completion of the last call of said group for opening said gate to calls then waiting in said storage circuit, means responsive to the entry of said waiting calls through said gate for immediately thereafter closing the same, and means responsive to the reclosing of said gate for neutralizing said holding means and thereby permitting those operator stations initiating the aforementioned group of calls to initiate new calls.

3. In a communication system, including an outlet station, a common radio channel, a plurality of receiving stations connected to said outlet station by said radio channel, and a plurality of calling stations sharing the use of said outlet station, control equipment connecting said calling stations to said outlet station and comprising means for storing calls attempted by said calling stations if the outlet station is in use, call accepting means operative only when said outlet station is free to admit only those calls then in the storage means, means assigning calls in said accepting means to said radio channel one at a time, and means responsive to the disconnection of a calling station from said outlet station at the completion of a call to lock out that station from connection to the storage means if any other waiting calls are present therein.

4. In a communication system, including an outlet station, a common radio channel, a plurality of receiving stations connected to said outlet station by said radio channel, and a plurality of calling stations sharing the use of said outlet station, control equipment connecting said calling stations to said outlet station and comprising means for connecting a first calling station to said outlet station, means for storing calls attempted by said calling stations if the outlet station is in use, call accepting means operative only when said outlet station is free to admit only those calls then in the storage means, means assigning calls present in said accepting means to said radio channel one at a time, and means for disconnecting a calling station from the outlet station at the expiration of a predetermined time interval.

5. In a communication system, including an outlet station, a common radio channel, a plurality of receiving stations connected to said outlet station by said radio channel, and a plurality of calling stations sharing the use of said outlet station, control equipment connecting said calling stations to said outlet station and comprising means for connecting a first calling station to said outlet station, means for storing calls attempted by said calling stations if the outlet station is in use, call accepting means operative only when said outlet station is free to admit only those calls then in said storage means, means assigning calls present in said accepting means to said radio channel one at a time, means for disconnecting a calling station from said outlet station at the expiration of a predetermined interval and means operated by said disconnecting means to provide a warning for the operator of such calling station prior to the disconnection of the calling station by said last-mentioned means.

References Cited in the file of this patent

UNITED STATES PATENTS

| Number | Name | Date |
| --- | --- | --- |
| 2,061,699 | Fox | Nov. 24, 1936 |
| 2,064,958 | Taylor | Dec. 22, 1936 |
| 2,490,061 | Jensen et al. | Dec. 6, 1949 |
| 2,530,815 | Dimmer | Nov. 21, 1950 |